(12) United States Patent
Garcia et al.

(10) Patent No.: US 9,025,030 B2
(45) Date of Patent: May 5, 2015

(54) VIDEO SYSTEM

(76) Inventors: Cheryl Garcia, Grand Terrace, CA (US); Christopher Sauceda, Rialto, CA (US)

(*) Notice: Subject to any disclaimer, the term of this patent is extended or adjusted under 35 U.S.C. 154(b) by 377 days.

(21) Appl. No.: 13/152,165

(22) Filed: Jun. 2, 2011

(65) Prior Publication Data

US 2011/0298929 A1 Dec. 8, 2011

Related U.S. Application Data

(60) Provisional application No. 61/397,219, filed on Jun. 8, 2010.

(51) Int. Cl.
*H04N 7/18* (2006.01)
*G08B 3/10* (2006.01)
*G08B 5/36* (2006.01)

(52) U.S. Cl.
CPC .................. *H04N 7/181* (2013.01); *G08B 3/10* (2013.01); *G08B 5/36* (2013.01)

(58) Field of Classification Search
CPC .............. G08B 3/10; G08B 5/36; G08B 7/06; H04N 7/181
USPC .......................................................... 348/159
See application file for complete search history.

(56) References Cited

U.S. PATENT DOCUMENTS

| | | | |
|---|---|---|---|
| 4,258,478 A | 3/1981 | Scott et al. | |
| 4,297,724 A | 10/1981 | Masuda et al. | |
| 4,731,743 A | 3/1988 | Blancato | |
| 5,894,320 A | 4/1999 | Vancelette | |
| 6,141,431 A | 10/2000 | Munetsugu et al. | |
| 6,346,937 B1 * | 2/2002 | Sasaki et al. | 345/211 |
| 6,556,196 B1 * | 4/2003 | Blanz et al. | 345/419 |
| 6,771,303 B2 * | 8/2004 | Zhang et al. | 348/14.16 |
| 7,634,103 B2 | 12/2009 | Rubinstenn et al. | |
| 8,013,304 B2 * | 9/2011 | Haigh et al. | 250/339.09 |
| 8,295,610 B1 * | 10/2012 | Brunner | 382/201 |
| 8,427,535 B2 * | 4/2013 | Davis | 348/77 |
| 8,462,206 B1 * | 6/2013 | McGuire et al. | 348/135 |
| 2003/0197779 A1 * | 10/2003 | Zhang et al. | 348/14.16 |
| 2004/0105657 A1 * | 6/2004 | Hossain | 386/52 |
| 2004/0239689 A1 | 12/2004 | Fertig | |
| 2005/0151743 A1 * | 7/2005 | Sitrick | 345/473 |
| 2005/0166938 A1 * | 8/2005 | Hoepfl et al. | 132/200 |
| 2005/0185069 A1 * | 8/2005 | Sim et al. | 348/239 |
| 2006/0007303 A1 * | 1/2006 | Milton | 348/77 |

(Continued)

FOREIGN PATENT DOCUMENTS

EP 1025696 B1 * 12/2010 ............... H04N 7/14

*Primary Examiner* — Andy Rao
*Assistant Examiner* — Shan Elahi
(74) *Attorney, Agent, or Firm* — Kirk A. Buhler; Buhler & Associates

(57) ABSTRACT

Improvements in a video system are presented that uses one or more camera(s) with a display system. The camera and display system operate together to allow a person to view the back or side of their head as they apply makeup or style their hair. The use of multiple cameras allows the person to view their hair, face or profile from different angles without requiring a single camera to be re-positioned or requiring the person to turn their head to view a particular area. The video system can blend the image from multiple cameras to achieve a view that is not from a single camera. The blending or morphing of the image allows the user the ability to obtain a view from nearly any angle without requiring them to move their head or adjust the camera angle.

14 Claims, 3 Drawing Sheets

(56) References Cited

U.S. PATENT DOCUMENTS

| | | | |
|---|---|---|---|
| 2007/0297064 A1* | 12/2007 | Watanabe et al. | 359/630 |
| 2008/0088440 A1* | 4/2008 | Palushaj | 340/539.25 |
| 2008/0294013 A1* | 11/2008 | Gobeyn et al. | 600/300 |
| 2009/0066784 A1* | 3/2009 | Stone et al. | 348/47 |
| 2009/0096811 A1* | 4/2009 | Tanaka et al. | 345/629 |
| 2009/0141941 A1 | 6/2009 | Wagg | |
| 2009/0207245 A1* | 8/2009 | Hayashi et al. | 348/92 |
| 2009/0303320 A1 | 12/2009 | Davis | |
| 2010/0030578 A1* | 2/2010 | Siddique et al. | 705/3 |
| 2010/0281636 A1* | 11/2010 | Ortins et al. | 15/4 |
| 2010/0299106 A1* | 11/2010 | Audoly et al. | 703/1 |
| 2011/0018985 A1 | 1/2011 | Zhu | |
| 2011/0066239 A1* | 3/2011 | Smoot et al. | 623/6.64 |
| 2011/0242361 A1* | 10/2011 | Kuwahara et al. | 348/231.4 |
| 2011/0249086 A1* | 10/2011 | Guo et al. | 348/14.12 |
| 2011/0267966 A1* | 11/2011 | Gao et al. | 370/252 |

* cited by examiner

VIDEO SYSTEM

CROSS REFERENCE TO RELATED APPLICATION

This application is a continuation-in-part of applicant's co-pending application Ser. No. 61/397,219 filed Jun. 8, 2010 the entire contents of which is hereby expressly incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention relates generally to a video system and, more particularly, the invention relates to a video system allowing uses a fuller view, of themselves when styling or cutting their hair and preparing for the day.

2. Description of Related Art Including Information Disclosed Under 37 CFR 1.97 and 1.98

When it comes to hair care, most men and women go to either a barber or a hair stylist for trims, cuts and other treatments. But women must prepare their hair every morning, and in increasingly over the past couple of decades, men of all ages have taken to wearing extremely close-cropped hair, and to doing the cutting themselves. The difficulty here, for both men and women. is that they cannot see how they look from behind. Several products and patents have been. Exemplary examples of patents covering these products are disclosed herein.

U.S. Published application 2011/0018985 was published on Jan. 27, 2011 for Linlin C. Zhu discloses a Hair Cutting System with Visualization Devices. This application is basically an electric razor with a camera connected to the razor that communicates with a view screen. While this device allows a person to view the back of a head, the device uses a single camera that is fixed to the razor. It does not allow the image of the head to be rotated to view and provides only a single image.

U.S. Pat. No. 7,634,103 issued on Dec. 15, 2009 to Gilles Rubinstenn et al., discloses an Analysis Using a Three-Dimensional Facial Image. This patent allows a person to apply virtual make-up on a captured image. The image simulates the aesthetic appearance but does not show a real-time image of the person as they apply makeup or modify their hair or appearance.

Published applications 2009/0066784 that published on Mar. 12, 2009 to David Wagg and 2009/0141941 that published on Jun. 4, 2009, to Jonathan James Stone et al disclose image processing apparatus and method. The system uses multiple cameras to estimate an orientation of one or more of a plurality of objects disposed on a plane. This invention only estimated an orientation but does not create a blended image of a person and further does not provide a method that allows a person to rotate the image in real-time to view their head.

U.S. Pat. No. 5,894,320 issued on Apr. 13, 1999 to Paul D. Vancelette and published application 2009/0303320 that published on Dec. 10, 2009 to Rick Davis both disclose multiple camera grooming display systems. These both use one or more cameras to view a person being groomed. They do not allow the person to view multiple images of the back and sides at the same time nor do they allow a person to rotate the image to view various angles.

What is needed is a personal grooming system that provides a real-time image that allows a person to view their head without requiring the person to use multiple mirrors to view the back and or sides of their head.

BRIEF SUMMARY OF THE INVENTION

It is an object of the video system to utilize at least one camera with at least one display system. The camera and display system operate together to allow a person to view the back or side of their head as they apply makeup or style their hair. The ability to view the back or side is important because of then this area may not be acceptably groomed or may have a flat area or hairs that stick out and can't be easily seen from a single mirror placed in front of the user.

It is an object of the video system to use multiple cameras placed around the user. The use of multiple cameras allows the person to view their hair, face or profile from different angles without requiring a single camera to be re-positioned or requiring the person to turn their head to view a particular area. Often when a person turns their head they must also move the display system to be able to get a clear view of the display.

It is an object of the video system to have a display that can show single and multiple views on one or more monitors. A single monitor can be used and set to show the image from just one or the cameras or can be set to show multiple views of the back sides or profiles of the user. Because the display shows a real-time image the person can turn their head to view how their hair moves and lands to determine if the result is acceptable.

It is another object of the video system to blend the image from multiple cameras to achieve a view that is not from a single camera. The blending or morphing of the image allows the user the ability to obtain a view from nearly any angle without requiring them to move their head or adjust the camera angle.

It is another object of the video system to not only be useful for the application of makeup or grooming but also for uses to monitor activity in other places of a house such as, but not limited to, monitoring a child as they sleep or play, monitoring employees as they groom people or animals.

It is still another object of the video system to include a joystick that may resemble a head whereby the user can rotate the head joystick to take a virtual tour around their head and face without requiring the person to turn their head. The image is created by using multiple real-time images from the multiple cameras and morphing the images to create a pseudo three dimensional image that can be viewed.

Various objects, features, aspects, and advantages of the present invention will become more apparent from the following detailed description of preferred embodiments of the invention, along with the accompanying drawings in which like numerals represent like components.

BRIEF DESCRIPTION OF THE SEVERAL VIEWS OF THE DRAWING(S)

DETAILED DESCRIPTION OF THE INVENTION

Figure 1:
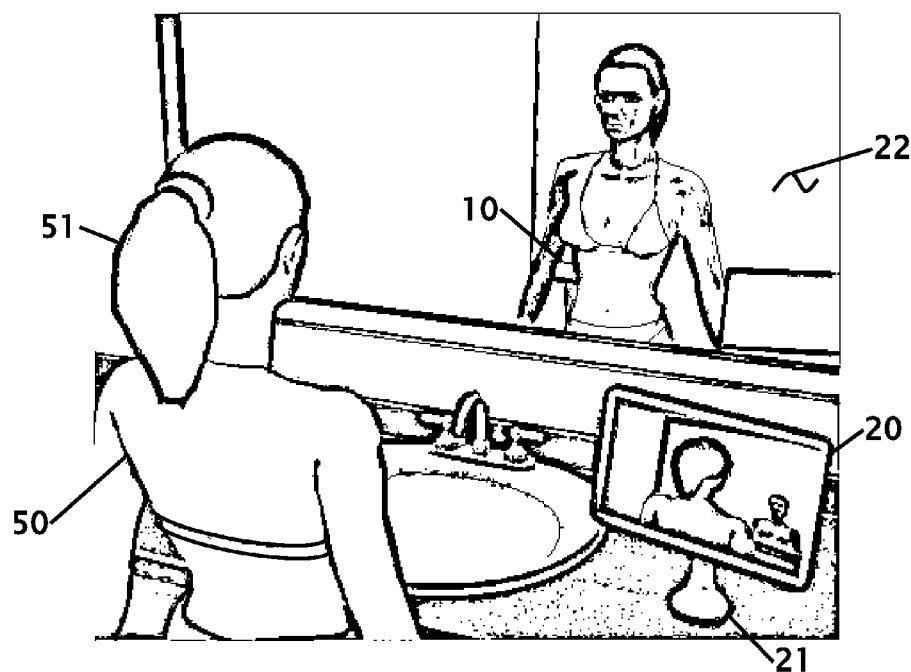
FIG. 1 shows a perspective view of a person using the video system with a single camera and display.
Figure 2:
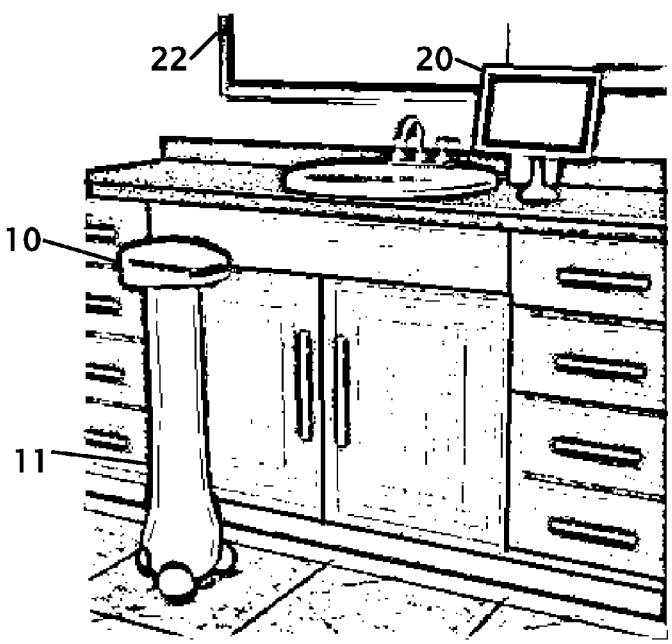
FIG. 2 shows a perspective view of the video system as a single camera and display.

FIGS. 1 and 2, shows one preferred embodiment where the video system provides users a fuller view of themselves when styling or cutting their hair 51 and preparing for the day. The video system of the present invention is a portable, camera 10 and screen 20, for showing a real-time video system where the camera 10 is set-up in one location and the screen 20 is set-up in another location. The video system of this first preferred embodiment consists of several components; a small, portable, powered or battery-powered, rechargeable, real-time or instant-view video camera 10; a lightweight, wheeled stand 11 or tripod for the camera 10 or a swing-arm, wall-mounting support for positioning the camera in a regular of fixed location 12 (from FIG. 3); a portable display or viewing screen 20, to link wired or wirelessly with the camera 10; a collapsible, portable stand 21 for the viewing screen 20; optionally a set of suction cups for mounting the screen on a wall or mirror 22; and a power connection for wall power or rechargeable batteries and rechargeable batteries and recharging cords for the camera 10 and screen 20.

In essence, this preferred embodiment of the video system is simple and straightforward. First, the user places the camera 10, using the wall-mount swing-arm 12 or the portable tripod/stand 10, where desired. In a bathroom, dressing room, or styling salon, the camera 10 might be positioned behind oneself (or one's client), and the viewing screen 20, which can be mounted on its stand 21 or on the suction cups for wall or mirror 22, is mounted facing the person (yourself or your client), thereby providing a 'rear view" for grooming, styling, or dressing purposes. Because the video camera 10 operates in real time, its image is viewable on the screen 20, the individual 50 would see a rear view, in real time which is a tremendous aid for styling and grooming the back of one's hair, checking the look of an outfit, and so forth. The video system provides for compete and easy portability of the camera 10 and screen 20, both of which can operate on rechargeable batteries.

This portability makes the video system useful not only in its primary, grooming or styling application, but also in other ways as well. For example, the video system functions as a portable security-camera. The user sets the camera 10 to monitor a door or window, to keep an eye on their car or driveway, to watch one side of the exterior of their house and, with the portable viewing screen 20, the camera's images can be viewed virtually anywhere in a within wireless range. The video system can be used to keep a watchful eye on one's kids playing in another room; to check on employees down technology, the video system is multi-functional, easy to use, fully portable, and eminently affordable system is multi-functional, easy to use, fully portable, and eminently affordable system for rear viewing.

Figure 3:
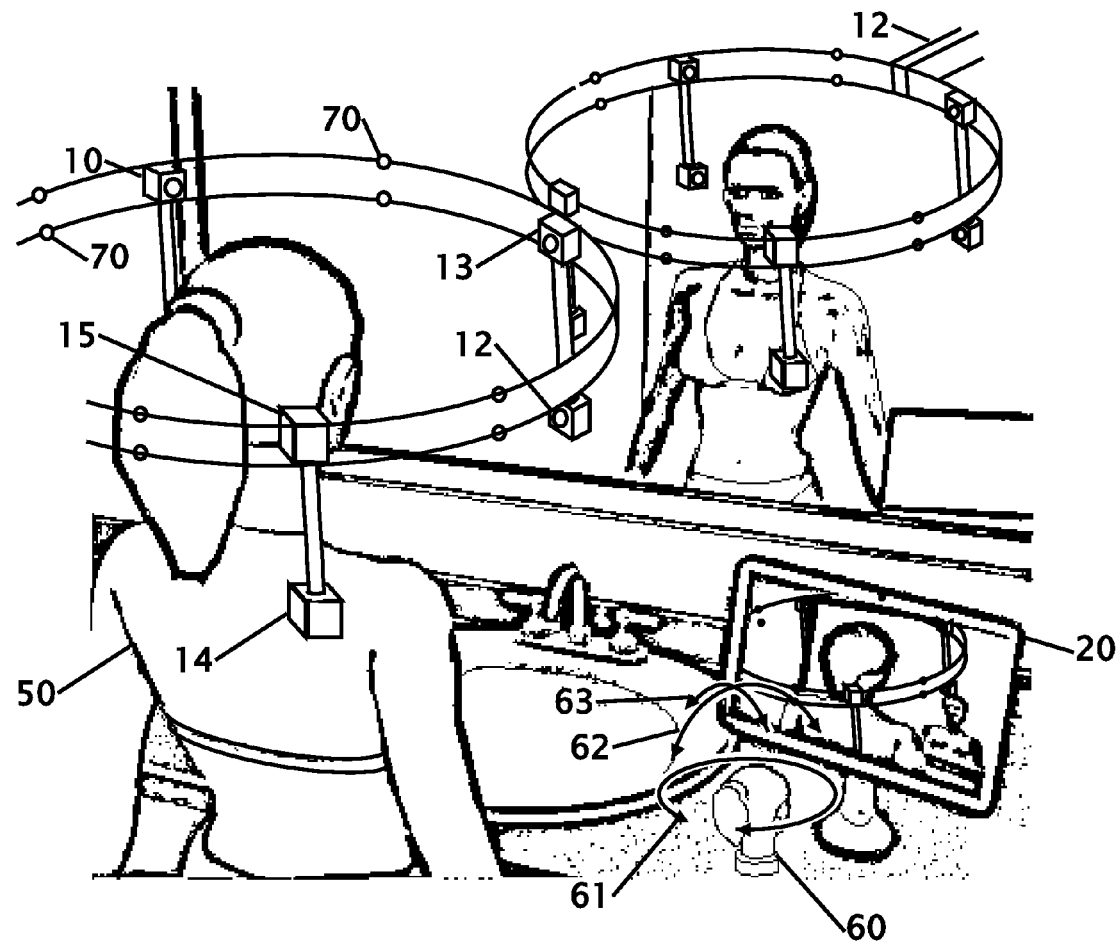
FIG. 3 shows a perspective view of a person using the video system with multiple cameras.
Figure 4:
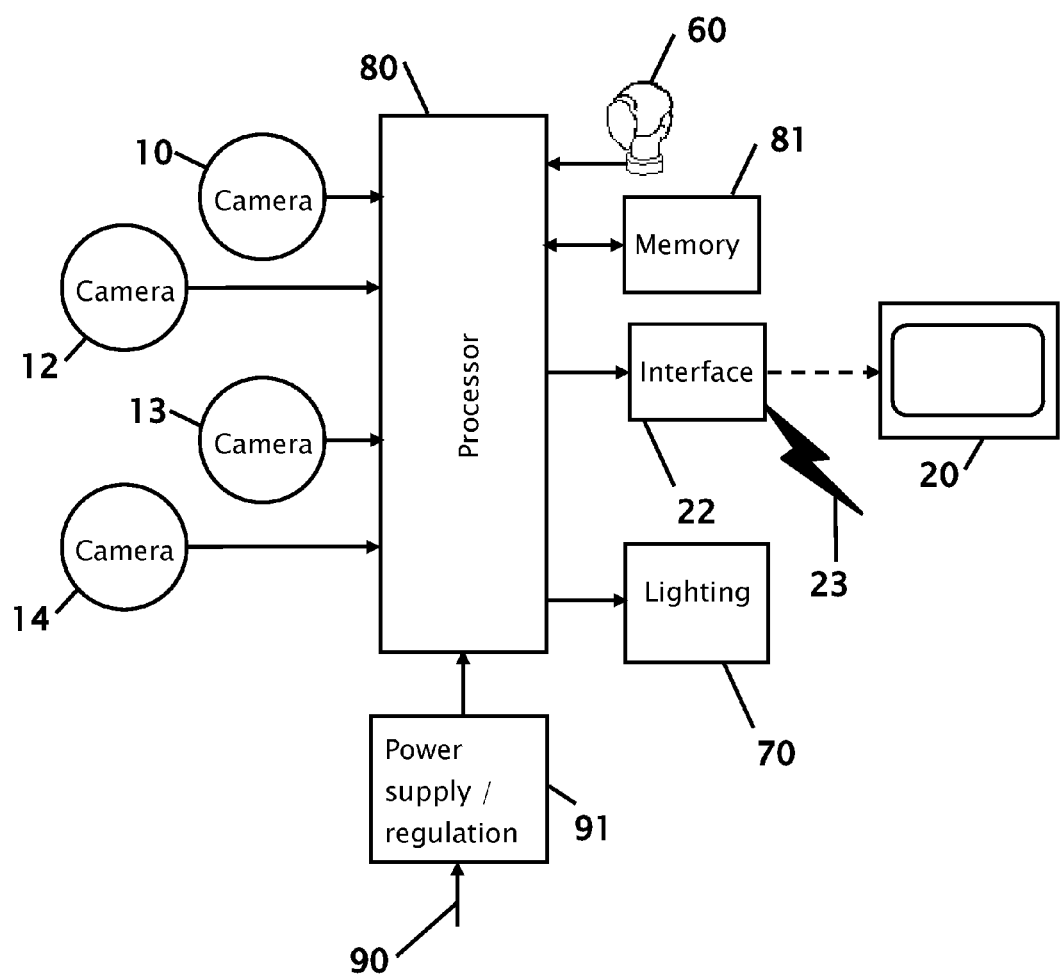
FIG. 4 shows a block diagram of the component for the video system.

FIG. 3 shows a perspective view of a person using the video system with multiple cameras and FIG. 4 shows a block diagram of the component for the video system. In this preferred embodiment the video system uses at least one camera 10, and in this embodiment eight cameras 10, 12, 13, 14, 15 etc., are shown. The multiple cameras can all be located at the same level, or can be located at different levels to obtain views from different angles as well as different elevations. While eight cameras are shown, as few as one to many more than eight are contemplated.

This embodiment includes at least one viewing device 20. The interface 22 and or link 23 between the camera(s) 10 and the viewing device 20 can be wired or wireless 23. If the interface is wireless, various wireless interface methods and systems are contemplated including but not limited to IR, RF, FM, Bluetooth, Wi-Fi and internet link 23. In the case of an internet link 23 or Wi-Fi link 23 the camera(s) 10 may be significantly distal from the viewing device 20 and or a control device 60. The link between the camera(s) 10 and the one viewing device(s) 20 allows at least some of the image being captured from the camera(s) 10 is shown on the viewing device 20. While only one viewing device 20 is shown, it is contemplated that a plurality of viewing devices could be used to enable viewing different angles or different camera(s) 10. It is also contemplated that the single display 20 screen can be split to view the image from several different camera(s) 10 or angles simultaneously. It is further contemplated that the camera(s) 10 and or display 20 can be adjustable for zooming in and out to look at a particular are or overall view. It is further contemplated that the display screen 20 can be adjusted to simulate different lighting conditions.

Because multiple camera(s) 10 are used the image from two or more cameras (10) can be blended or morphed to allow for viewing of hybrid images that would not be available from a single camera 10. To allow a person 50 to adjust the viewing angle a rotatable control device 60 for controlling a virtually rotatable image that is derived from the multiple camera(s) 10 and is viewed on the viewing device 20. The rotatable control device 60 can be rotated left and right 61 to change the viewing camera 10 and or the viewing angle that is being displayed on the screen 20. The rotatable control device 60 can be configured to provide fixed rotational intervals or steps or infinitely variable intervals. It is further contemplated that the rotatable control device 60 can have the ability to tip front-to-back 62 and side-to-side 63. The camera(s) 10 supporting structure may further include lighting elements 70 to provide supplemental illumination.

It is further contemplated that the controller 80 can have memory 81 for storing at least one image. The storage may further include user preset values for display, zoom, rotation and lighting. The display may show a split screen with a stored image and a live image. The memory may be a hard drive, a flash drive, is permanent, removable or stored over the internet for accessing. A power supply such as connected to an AC power outlet 90 or batteries is filtered or regulated 91 to supply power to the camera 10 processor 80 and or the display device 20.

Thus, specific embodiments of a Video System have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. A video system comprising:
   at least two cameras;
   at least one viewing device;
   a link between said at least two cameras and said at least one viewing device whereby at least some of an image being captured from said at least two cameras is shown on said at least one viewing device;
   said at least two cameras are placed at known locations;
   a storage means for storing at least one image;

an image from said at least two cameras is blended or morphed to provide an image on said at least one viewing device to create a single continuous image that is not available from either single camera, and said viewing device can show both said stored at least one image and a live image at the same time as two separate distinct images when viewed from a single location.

2. The video system according to claim 1 wherein said image is adjustable for zooming in and out of at least one of said at least two cameras.

3. The video system according to claim 1 wherein said at least one viewing device is adjustable to simulate different lighting conditions.

4. The video system according to claim 1 wherein said at least one viewing device is adjustable to display an image from a single camera or to display multiple images from a plurality of cameras.

5. The video system according to claim 1 wherein said link is wired between said at least two cameras and said at least one viewing device.

6. The video system according to claim 1 wherein said link is wireless between said at least two cameras and said at least one viewing device.

7. The video system according to claim 6 wherein said wireless link is IR, RF, Bluetooth, Wi-Fi and internet.

8. The video system according to claim 1 that further includes a rotatable control device for controlling a virtually rotatable image that is derived from said multiple cameras and is viewed on said at least one viewing device as hybrid or morphed images from said multiple cameras.

9. The video system according to claim 8 wherein said multiple cameras are placed at different heights from a ground.

10. The video system according to claim 9 wherein said rotatable control further includes the ability to tip front-to-back and side-to-side.

11. The video system according to claim 8 wherein said image can display as a rotating image.

12. The video system according to claim 1 wherein said multiple cameras are placed at different heights from a ground.

13. The video system according to claim 1 that further includes at least one illumination device.

14. The video system according to claim 1 wherein said image can display from predetermined angles of rotation.

* * * * *